United States Patent
Riendeau et al.

(10) Patent No.: US 9,002,672 B2
(45) Date of Patent: Apr. 7, 2015

(54) METHOD AND SYSTEM FOR TIME SYNCHRONIZATION OF PHASE OF SIGNALS FROM RESPECTIVE MEASUREMENT DEVICES

(75) Inventors: Sylvain Riendeau, Varennes (CA); François Léonard, Montréal (CA); Patrick Picher, La Prairie (CA); Michel Gauvin, La Prairie (CA); Hugo Bertrand, Sainte-Julie (CA); Louis Dupont, Sainte-Julie (CA)

(73) Assignee: Hydro-Québec (CA)

( * ) Notice: Subject to any disclaimer, the term of this patent is extended or adjusted under 35 U.S.C. 154(b) by 273 days.

(21) Appl. No.: 13/618,439

(22) Filed: Sep. 14, 2012

(65) Prior Publication Data

US 2013/0018620 A1    Jan. 17, 2013

Related U.S. Application Data

(63) Continuation of application No. PCT/CA2011/050143, filed on Mar. 16, 2011.

(30) Foreign Application Priority Data

Mar. 24, 2010   (CA) .................................... 2699596

(51) Int. Cl.
| | | |
|---|---|---|
| *G01D 18/00* | (2006.01) | |
| *G01M 5/00* | (2006.01) | |
| *G01S 7/40* | (2006.01) | |
| *G01S 13/00* | (2006.01) | |

(52) U.S. Cl.
CPC .. *G01M 5/00* (2013.01); *G01S 7/40* (2013.01); *G01S 13/003* (2013.01)

(58) Field of Classification Search
USPC ........................................... 702/89, 125, 127
See application file for complete search history.

(56) References Cited

U.S. PATENT DOCUMENTS

| | | | |
|---|---|---|---|
| 5,237,325 A | 8/1993 | Klein et al. | |
| 5,757,786 A | 5/1998 | Joo | |
| 6,104,729 A | 8/2000 | Hellum et al. | |

(Continued)

FOREIGN PATENT DOCUMENTS

WO    2008043427 A2    4/2008

OTHER PUBLICATIONS

International Search Report & Written Opinion of the International Searching Authority; Application No. PCT/CA2011/050143; Issued: Jun. 6, 2011; Mailing Date: Jun. 20, 2011; 12 pages.

(Continued)

*Primary Examiner* — Mischita Henson
(74) *Attorney, Agent, or Firm* — St. Onge Steward Johnston & Reens LLC

(57) ABSTRACT

According to the invention, a time synchronization of phase between measurement devices that do not share a same clock for their respective sampling of the signals is carried out by a time tagging of samples of the signals in time blocks followed by an adjustment of the phase values of components of interest of the signals in the regrouped time blocks so that the values refer to common time references between the measurement devices. The tagging is carried out with a synchronization signal available to the measurement devices, completed with count values provided by a counter operated by a reference clock for each measurement device.

22 Claims, 4 Drawing Sheets

(56) References Cited

U.S. PATENT DOCUMENTS

| | | |
|---|---|---|
| 6,407,699 B1 | 6/2002 | Yang |
| 6,497,699 B1 | 12/2002 | Ludvig et al. |
| 6,792,063 B1 | 9/2004 | Ogura |
| 6,845,333 B2 | 1/2005 | Anderson et al. |
| 7,031,859 B2 | 4/2006 | Piesinger |
| 7,133,397 B2 | 11/2006 | Jones et al. |
| 7,471,241 B1 | 12/2008 | Yang |
| 7,630,863 B2 | 12/2009 | Zweigle et al. |
| 7,656,985 B1 | 2/2010 | Aweya et al. |
| 8,041,981 B2 | 10/2011 | Cornelius |
| 8,179,150 B2 | 5/2012 | Santos |
| 2001/0043098 A1 | 11/2001 | Locker et al. |
| 2009/0117928 A1 | 5/2009 | Ladd et al. |

OTHER PUBLICATIONS

F. J. Harris, "On the use of windows for harmonic analysis with the discrete Fourier transform", Proceeding of IEEE, vol. 66, No. 1, pp. 51-83, 1978.

Synchronisation of Bistatic Radar Systems, Weiss, 0-7803-8742-2/041$20.00 (C) 2004 IEEE.

METHOD AND SYSTEM FOR TIME SYNCHRONIZATION OF PHASE OF SIGNALS FROM RESPECTIVE MEASUREMENT DEVICES

CROSS-REFERENCE TO RELATED APPLICATIONS

The present application is a continuation of pending International patent application PCT/CA2011/050143 filed on Mar. 16, 2011 which designates the United States and claims priority from Canadian patent application 2,699,596 filed on Mar. 24, 2010. The content of all prior applications is incorporated herein by reference.

FIELD OF THE INVENTION

The invention relates to a method and a system for time synchronization of phase of signals from respective measurement devices.

BACKGROUND OF THE INVENTION

Various systems, processes and techniques require carrying out a time synchronization of phase measurements between different converting devices that do not share a same clock signal for their respective sampling. Many of the existing systems perform a sampling by a clock locked on a common time reference. This approach requires equipment achieving a feedback (phase-lock-loop) between the phase of the sampling clock and the time reference, which results in costs. Furthermore, this approach limits the strategies for noise reduction since the noise of the sampling clock and that of the reference clock are mixed with the clock drive errors.

SUMMARY OF THE INVENTION

An object of the invention is to provide a method and a system for time synchronization of phase of signals from respective measurement devices which has a low cost in comparison with the existing techniques and which is potentially more precise.

Another object of the invention is to provide a replacement of the usual equipment used for the time synchronization of phase measurements by a time tagging of samples of the measurement signals, followed by calculations correcting the sampling frequency, the time tag to which the phase is referenced, as well as temporal characteristic and phase values of each component of interest in the signals.

According to an aspect of the invention, there is provided a method for time synchronization of phase of signals from respective measurement devices, the method comprising the steps of:

for each measurement device:
  receiving a synchronization signal available to each measurement device;
  producing a reference clock signal having a higher rate than the synchronization signal;
  operating a counter in response to the reference clock signal to produce count values;
  completing the synchronization signal with the count values provided by the counter;
  selecting at least one time block having a finite number of samples in the signal from the measurement device;
  establishing time locations of at least two samples of each time block with the completed synchronization signal;
  estimating a phase value and a temporal characteristic of at least one component of the signal from the measurement device in each time block;
  assigning a time tag derived from the completed synchronization signal to each time block; and
  producing data representative of the at least one component, the phase value, the temporal characteristic, the time locations and the time tag for each time block; and for all the measurement devices:
  regrouping the data relative to the time blocks having like time tags under same time tags used as common time references; and
  calculating new phase values of the at least one component in the time blocks according to the respective common time references and the corresponding time locations for the time
  synchronization of phase of the signals from the measurement devices.

According to another aspect of the invention, there is provided a system for time synchronization of phase of signals from respective measurement devices, the system comprising:

for each measurement device, a phase measurement unit comprising:
  a receiver that receives a synchronization signal available to each phase measurement unit;
  a clock that produces a reference clock signal having a higher rate than the synchronization signal; and
  a processing unit; and for all the measurement devices, a phase processing unit comprising a processing unit;
  the processing unit of each phase measurement unit being configured to receive the signal from the corresponding measurement device, receive the synchronization signal, receive the reference clock signal, provide a counter operating in response to the reference clock signal to produce count values, complete the synchronization signal with the count values provided by the counter, select at least one time block having a finite number of samples in the signal from the measurement device, establish time locations of at least two samples of each time block with the completed synchronization signal, estimate a phase value and a temporal characteristic of at least one component of the signal from the measurement device in each time block, and produce data representative of the at least one component, the phase value, the temporal characteristic, and the time locations;
  the processing unit of one of each phase measurement unit and the phase processing unit being configured to assign a time tag derived from the completed synchronization signal to each time block, the time tag forming part of the data relative to each time block; and
  the processing unit of the phase processing unit being configured to regroup the data relative to the time blocks having like time tags under same time tags used as common time references, and calculate new phase values of the at least one component in the time blocks according to the respective common time references and the corresponding time locations for the time synchronization of phase of the signals from the measurement devices.

The following provides an outline of certain possibly preferable features of the invention which are to be considered non-restrictively.

The present invention is directed to a time synchronization of phase between two or several measurement devices that do not share a same clock for their respective sampling of the signals to be measured. The measurement devices digitize one or several analog signals in time blocks or in a continuous mode. The time synchronization of the phase resides in adjusting the phase values so that they refer to a common time reference between the different devices. The synchronization of the phase relates to one or several spectral components. Subsidiarily, a correction of the frequency of each component may also be achieved. A spectral component may be the result of a Fourier transform, of a wavelet analysis or of any other process leading up to assigning a phase value to a signal component. The converting units associated to the measurement devices may be an element of a permanent, portable or mobile system.

The synchronization signal representing the common time reference preferably derives from a GPS receiver, but it may also derive from a carrier wave generated locally and transmitted by radio, by electrical conduction or by any other means (for example IEEE 1588) and digitally converted if needed.

The invention is directed in particular to systems, processes and techniques using a system of distributed measurements and requiring a high precision of the synchronization of the measured phase and this at low material cost. For example, in the area of electricity transport networks, it is required that the PMUs ("Phase Measurement Units") that achieve synchronized phase measurements have a fast response time, and this to the detriment of the cost and the precision. Conversely, the precision gain brought by the method according to the invention and its low cost allow in particular the economical monitoring of the dielectric state of transformer bushings. In the industrial area, the control of remote motors or other processes may take advantage of the invention in order to synchronize the different equipments (in particular the papermakers and the conveyors). It is a matter of comparing the phases of different measurements as those resulting from an angular sensor or from any other sensor providing information on the cyclic state (displacement, speed, acceleration, revolution counter) of a unit involved in the process. In the area of vibration measurement, and more particularly of modal analysis, over wide areas such as on a drilling platform, the invention allows a precise synchronization of the phase measurements carried out by different devices located at different locations. In the area of localization, such as sonars and radars, the invention allows a precise estimation of the orientation of one or several wave fronts from a distribution of stationary or moving receivers.

To sum up, the method for time synchronization of phase according to the invention involves several phase measurement units PCUs ("Phase Computing Units") and at least one phase processing unit PPU. Each PCU is connected to one (or several) measurement device as a sensor that may form a part of the PCU or be externally affixed on another equipment, and may comprise a processing unit, a GPS receiver providing a synchronization signal, a reference clock and a communication interface. The PPU may comprise a processing unit and a communication interface. The following steps may be carried out in each PCU:
  (a) the signal from the sensor to which the PCU is associated is first digitized if needed and routed toward its processing unit;
  (b) the processing unit receives a synchronization signal from the GPS receiver as well as a reference clock signal;
  (c) the processing unit has a counter receiving the reference clock signal and incrementing its count in response to a time mark such as each clock tick in the reference clock signal;
  (d) the counter is preferably reset in response to a time mark in the synchronization signal provided by the GPS receiver such as a transition of the synchronization signal, and the processing unit memorizes the "OPPS" value corresponding to a count value of the counter at the occurrence of the time mark in the synchronization signal;
  (e) the processing unit assigns a count value to certain samples of the digitized signal;
  (f) the processing unit selects a time block having a finite number of samples (e.g. comprised between 16 and 65536 samples) in the digitized signal;
  (g) the processing unit retains at least one and preferably two count values connected to samples in the selected block as well as the memorized OPPS value;
  (h) the processing unit retains a time reference e.g. {hour:minute:second} and optionally {day:month:year} provided by the GPS receiver for at least one of the samples of the selected block;
  (i) the processing unit performs a transform of the signal (time-domain) digitized in a representation domain where components of interest of the digitized signal are distinguishable;
  (j) the processing unit estimates and retains a phase value as well as a temporal characteristic value of one or several components of interest observed in the selected block, like its frequency, its scale or its periodicity; and
  (k) the processing unit transmits data representative of the retained values to the PPU or proceeds with further processing.

The following steps may be carried out in each PCU or the PPU:
  (l) the OPPS value is used to assign respective time values to the count values that have been retained, connected to the samples in the selected block;
  (m) from the time values of the retained count values, the processing unit (of the PCU or the PPU, depending on the case) assigns a temporal characteristic value (e.g. frequency, scale, periodicity) to each component of interest;
  (n) from one of the time values of the retained count values, the processing unit assigns a time tag to the selected block;
  (o) if a time reference of the phase value does not correspond to a position of the assigned time tag, from the time values of the retained count values, the processing unit adjusts the phase value of each component so that it corresponds to a time reference determined by the time tag of the selected block; and
  (p) in the case where the previous steps are carried out by a PCU, the processing unit of the PCU transmits data representative of the time tag of the selected block and the phase value as well as the temporal characteristic value of the component(s) observed in the selected block to the PPU.

The following steps may be carried out in the PPU:
  (q) among the blocks coming from several PCUs, the processing unit regroups those that have a like time tag according to a predetermined similarity criterion;
  (r) the processing unit converts the phase values of each component of interest of each regrouped block according to a common time reference determined by a common time tag assigned to the regrouped blocks; and (s) the processing unit provides the common time tag, the converted phase value, as well as the temporal characteristic value of the component(s) observed in the blocks regrouped under the common time tag, thereby achieving the time synchronization of phase of the measurement signals.

The PCUs and PPU may be a permanent, portable or mobile element of a system. The PPU may be integrated in the processing unit of a PCU. Several PCUs may share a GPS receiver, a reference clock, and/or a communication interface.

In the case of a sensor providing an analog signal, the analog signal passes by an analog-to-digital converter (ADC) that samples and digitizes the signal. Before reaching the processing unit of a PCU, the signal may pass by protection and conditioning circuits. The conditioning circuit may comprise an amplifier, a filter, and/or an integrator or differentiator. An anti-aliasing filter may be included in the conditioning circuit or the converter.

The digitized signal may pass by a galvanic insulation before being received by the processing unit of a PCU. One or several digitizing subunits may be connected to the processing unit of a PCU by a common bus.

The processing unit of a PCU may assign a count value to all the samples of the digitized signal instead of only certain samples.

In the case of a continuous digitizing of the signal issued from a sensor, the signal is preferably cut in successive time blocks that may temporally overlap or not.

The digitized signal may be subjected to a decimation before a block is extracted thereof.

The processing unit of a PCU may retain two count values of the counter, consisting for example respectively of the count_0 corresponding to the first sample of the selected time block and the count_N−1 corresponding to the last sample of the same block. The count_0 and count_N−1 values correspond to remote samples in the block or in the vicinity of the selected time block.

In the case where a temporary loss of the synchronization signal would occur, it may be the last OPPS value which is retained by the PCU for its calculation. The PCU may be configured to detect a synchronization loss, tag the corresponding blocks and manage the counter accordingly. The synchronization loss may be detected, for example, by a count disparity of several standard deviations with respect to a running mean of the last OPPS. The PCU may transmit the synchronization state of each block to the PPU, warning it of an eventual synchronization loss. The state of the GPS receiver transmitted by the GPS receiver to the PCU may also be relayed by the PCU to the PPU.

The OPPS value may be used along with the value of the time reference provided by the GPS receiver to assign a time tag to the count values of the counter that have been retained. The time tag may point the beginning, the middle or the end of the selected block in the PCU, or another predetermined position of the block if desired.

The value of the time reference provided by the GPS receiver may be expressed in another time unit if desired, e.g. in seconds since a given date.

The processing unit of a PCU may also estimate and retain an amplitude value of one or several components observed in the selected block, and transmit it or them to the PPU for processing purposes with the other data.

The regrouping of the blocks in the PPU may be made at a given time interval, be made in response to a command or be made at each arrival of a new data set from the PCUs.

The common time reference may be a predetermined value, one of the values of the time tags of the regrouped data set, or a tag corresponding to a temporal mean of the time tags of the regrouped data set.

A spectral window may be applied on the selected block subjected to the transform in order to limit an error introduced by a spectral overlapping of the components. The component(s) may result from a Fourier transform, a wavelet analysis, a cyclostationarity analysis or any other process leading up to assigning a phase value to a signal component. In the three specified cases, frequency, scale and periodicity will respectively characterize a component.

In the case of passive radar localization, a block may be selected according to a key (pattern) recognizable in the signal by the different PCUs. For example, the key may correspond to a distinct RF transient coming from an AM, FM, TV station or else and exhibiting a good signal-to-noise ratio. Each reflection creates a reproduction of the key. In the PCU, the time position of a key or of its reproduction is then established at two levels, roughly according to its envelope and finely according to its phase. A comparison of the keys captured by the different PCUs allows associating the keys derived from a same transmission and inferring the delays and relative Doppler effects. The blocks may be sampled over more than one RF signal band in order to use the statistical coincidence of the obtained localizations to increase the robustness and the precision.

The method allows increasing a precision of the time synchronization of phase by reducing a temporal dispersion of the synchronization signal, with the following steps:

(a) transmitting from a PCU to the PPU and storing in the PPU, for each block, the count values used in the processing of the block, including the OPPS value;

(b) applying a digital filter on the successive OPPS values gathered by the PPU and thus generating new OPPS values;

(c) regenerating the count values of the counter of the PCU from the new filtered OPPS values;

(d) using the new OPPS values to assign time values to the count values that have been retained;

(e) using the old count values to get back the initial phase and temporal characteristic values of the components observed in the blocks having the same time tag;

(f) recalculating, from the new OPPS and count values calculated in (b) and (d) and the old values recovered in (e), the phase and temporal characteristic values of the components observed in the blocks having the same time tag; and (g) recalculating the time tag of the regrouped blocks as function of the filtered OPPS values or converting the phase values as function of the old common time tag.

Steps (b), (c), (d) and (e) may be replaced with a correction of the phase and of temporal characteristic value from the values resulting from an application of a digital filter, e.g. FIR ("Finite Impulse Response") or IIR ("Infinite Impulse Response"), on the successive OPPS values gathered by the PPU.

Step (f) may be replaced by reducing a temporal drift of the reference clock signal with the following steps:

(a) generating, by interpolation of the OPPS values, a time transfer function that converts the new count values resulting from the filtered OPPS values into count values that would correspond to those generated by a counter driven by a constant frequency clock exhibiting a constant OPPS value called hereinafter OPPSP;

(b) applying the transfer function to the new count values in order to correct them;

(c) using the new OPPSP value to assign a time value to the count values that have been retained; and (d) recalculating, from the OPPSP value and the corrected time values of count, phase and temporal characteristic values of the components observed in the blocks having the same time tag.

In the case where a temporary loss of the synchronization signal would occur, the PPU may resume the calculation of a PCU by considering the valid OPPS counts before and after the synchronization loss. A linear interpolation of the missing counts may be achieved before proceeding with the recalculation of the time tags and phase and temporal characteristic values of the components observed in the blocks derived from the PCU subjected to the synchronization signal loss.

The interpolation may apply on a series formed of a successive sum of a series of OPPS values.

The regenerated count values may contain no reset for a certain time period so as to give a continuous progression count.

An observed component may be a cyclostationarity characterized by an amplitude, a periodicity and a phase, the periodicity being processed as the inverse of the frequency.

The PPU may be configured to identify measurements that may be biased due to for example a climatic phenomenon like rain or a phenomenon having a similar effect on the measurements, in order for example to reject them and not use them in calculations used to establish diagnoses based on the time synchronization of phase measurements according to the invention, as for example for a monitoring of transformer bushings (i.e. of possible defective conditions). In such as case, the PPU may carry out the following steps:

(a) making successive estimations of time differences of phase angle differences based on the phase values of the components of the regrouped blocks;

(b) calculating standard deviations on the successive estimations; and (c) invalidating a measurement depending on whether the corresponding standard deviation exceeds a predetermined rejection threshold.

The PPU may then be configured to stop the calculations used to establish a diagnostic until the measurements are valid again, meaning that the perturbing phenomenon causing significant transients on the differential measurements has finished. The successive estimations may be made on time differences of tangents of phase angle differences if desired.

BRIEF DESCRIPTION OF THE DRAWINGS

A detailed description of the preferred embodiments of the invention will be given hereinbelow in reference with the following Figures.

DETAILED DESCRIPTION OF THE INVENTION

As used in connection with this disclosure, the term "temporal characteristic" designates a frequency, a scale, a periodicity or a similar parameter of a component of interest of a signal.

Figure 1:
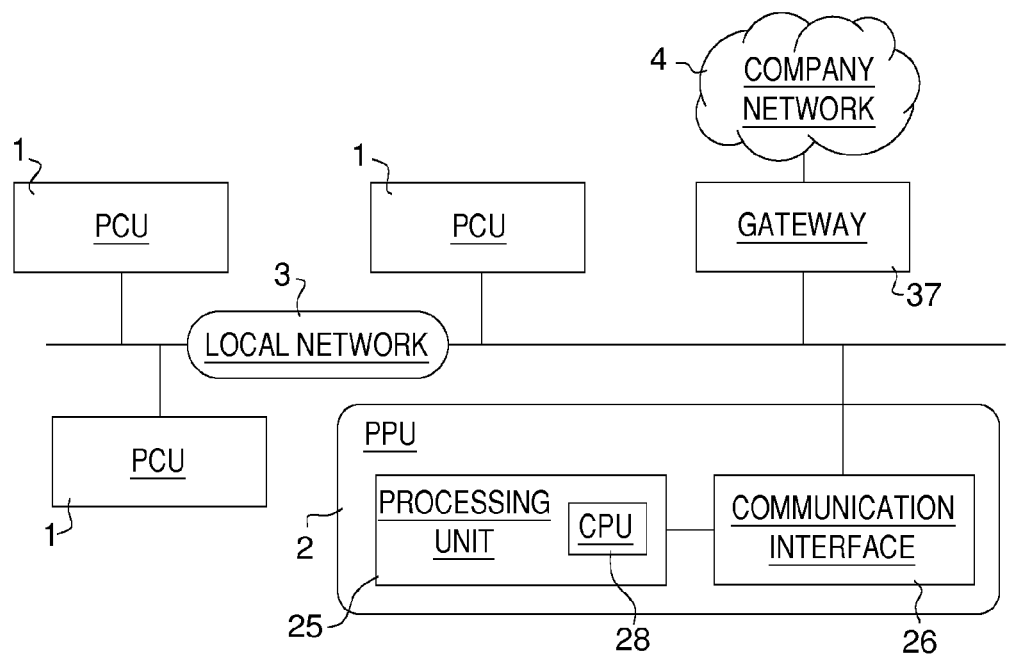
FIG. 1 is a schematic diagram showing an example of architecture of a system according to the invention.

Referring to FIG. 1, there is shown an example of architecture of a system according to the invention where several phase measurement units 1 (also called hereinafter phase computing units or PCUs) are connected to a phase processing unit or PPU 2 via a local communication network 3 that may itself be connected to a larger network 4. Other PCUs (not shown) may also be added through the larger network 4. In a possible configuration of the system according to the invention, the role of each PCU 1 is to estimate amplitude, phase and frequency values of one or several spectral components of a measured signal while associating a time tag to these data, whereas the role of the PPU 2 is to process the data derived from the PCUs 1 in order to regroup them under like time tags to achieve the time synchronization of phase of the measurement signals and transmit the data so processed for example for their use by an equipment requiring such data or for storage in a database.

Figure 2:
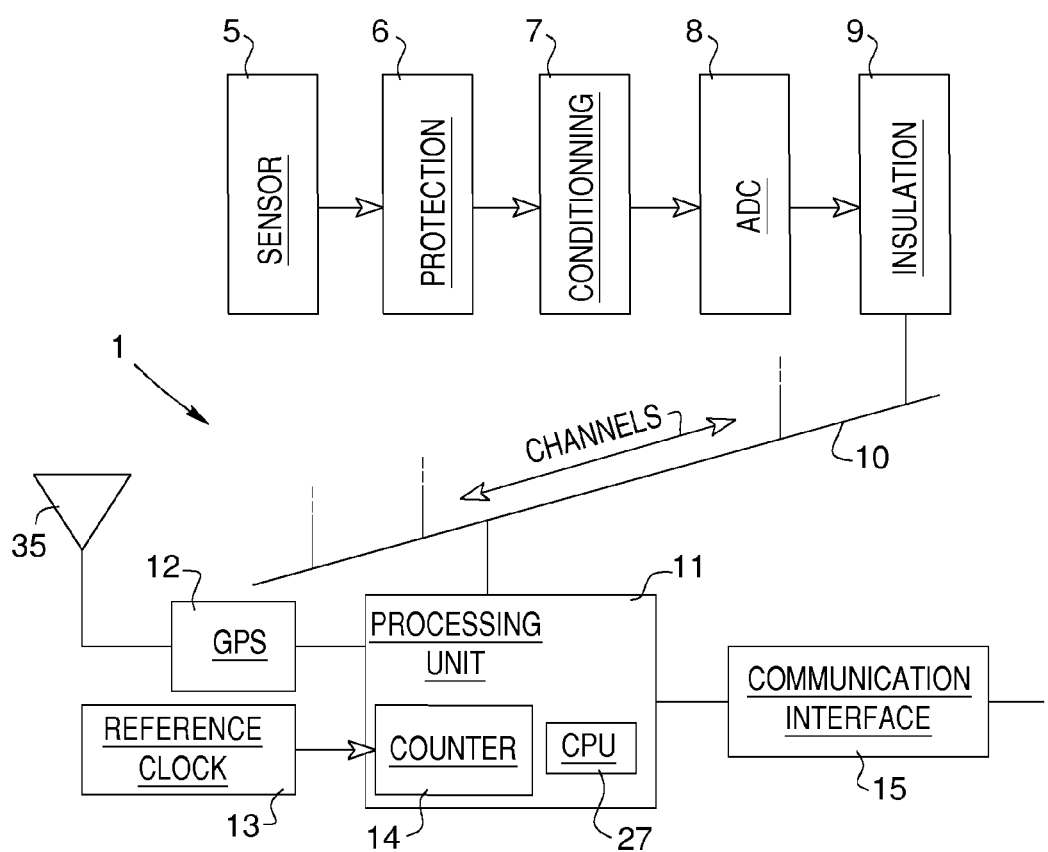
FIG. 2 is a schematic diagram showing a phase measurement unit (PCU) according to the invention.

Referring to FIG. 2, a PCU 1 may be provided with a digitizing unit comprising a sensor 5 or another measurement device, integrated or externally affixed on an equipment (not shown), to produce a measurement signal in respect with a feature of the equipment to be monitored. Prior to a digital conversion of the analog signal by a converter 8, the signal may pass through a protection circuit 6 and a conditioning circuit 7 (e.g. amplifier, filter, integrator, differentiator . . . ). An anti-aliasing filter may be included in the conditioning circuit 7 or the converter 8. One or several digitizing units may be connected to a processing unit 11 through a common bus 10. Preferably, each digitizing unit has a galvanic insulation 9 with respect to the bus 10 connecting it to the rest of the system. In the case of a sensor having a digital output, the converter 8 is not required. The processing unit 11 receives a synchronization signal as well as a signal from a reference clock 13. The synchronization signal preferably derives from a GPS receiver 12, but may also derive from a carrier wave locally generated and transmitted by radio, electrical conduction or any other appropriate transmission medium if desired. The synchronization signal may take the form of one pulse per second, or another form providing a time mark allowing a time synchronization in a pre-established time unit. The processing unit 11 has a counter 14 receiving the signal from the reference clock 13 and incrementing its count in response to a time mark such as a clock tick in the signal of the clock 13. The clock 13 has stability specifications chosen as function of the intended application and the material environment (e.g. temperature and stability of the power supply). The counter 14 is preferably reset at a transition of the synchronization signal from the GPS receiver 12. The measurement signal may be digitized in continuous mode or by time blocks. In the case of a continuous digitization, the measurement signal is cut in successive time blocks that may be time overlapped or not. In a possible configuration of a PCU 1, the processing unit 11 estimates the amplitude, the frequency (or another temporal characteristic) and the phase of one or several spectral components of a digitized signal block and assigns a time tag to the block. These operations may be performed by a processor 27 or a similar circuit with a memory in the processing unit 11. The data resulting from the processing are transmitted to the PPU 2 (shown in FIG. 1) via a communication interface 15.

Figure 3:
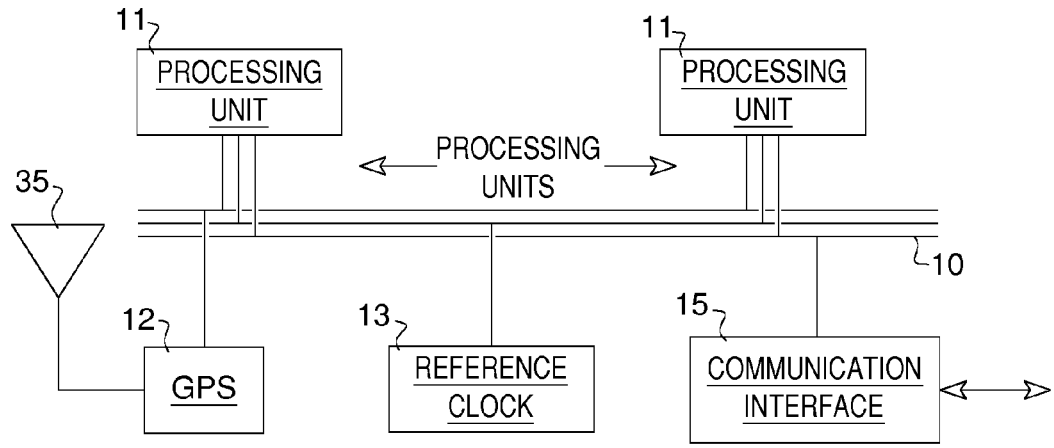
FIG. 3 is a schematic diagram showing a configuration shared between different phase measurement units (PCUs) according to the invention.

Referring to FIG. 3, several PCUs 1 may share a same GPS receiver 12, a same reference clock 13 and a same communication interface 15.

Figure 4:
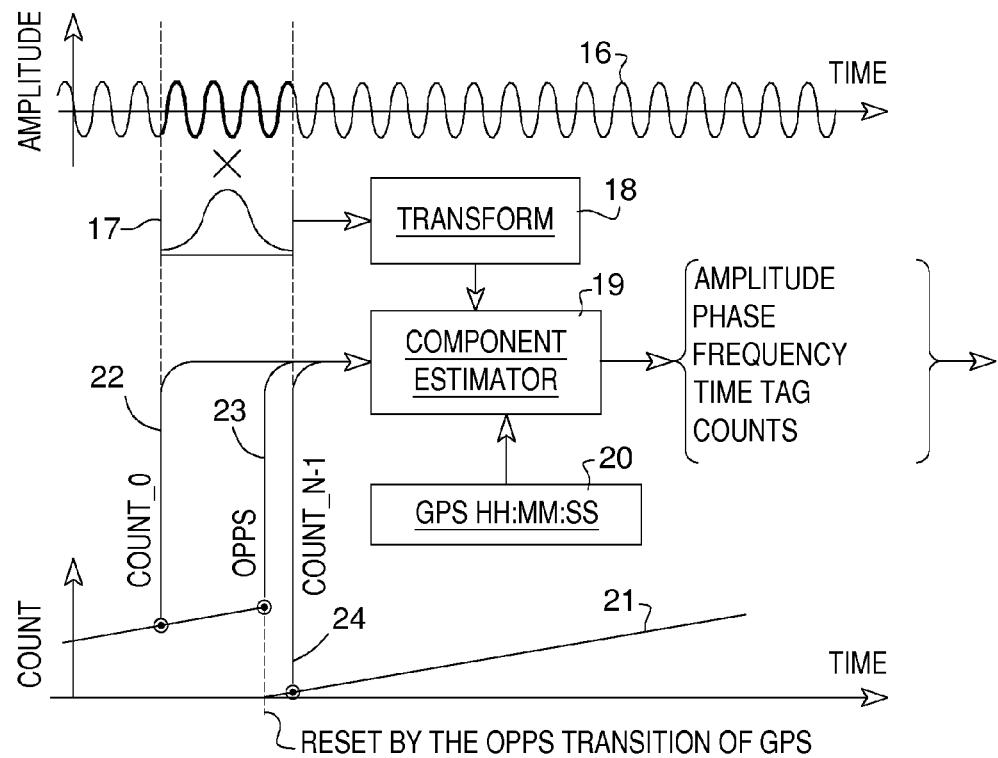
FIG. 4 is a schematic diagram showing a processing carried out by a phase measurement unit (PCU) according to the invention.

Referring to FIG. 4, there is shown a processing that a PCU 1 (as shown in FIG. 1) may carry out. For practical reasons, the sampled signal 16, the spectral window 17 and the count value 21 are presented as continuous values whereas in reality, they are series of discrete values. The sampled signal 16 may correspond to the digitized signal or to a decimation of the digitized signal. In order to limit the error introduced by the spectral overlapping of the components (spectral leakage, cf. F. J. Harris, "On the use of windows for harmonic analysis with the discrete Fourier transform", Proceeding of IEEE, Vol. 66, no. 1, pp. 51-83, 1978), a spectral window 17 is preferably applied on the signal block subjected to a transform 18. The spectral window 17 will preferably have a shape close to a Gaussian and will exhibit a high side lobe rejection rate. The transform 18 converts the temporal signal into spectral information where the energy of a tone gets regrouped at a frequency with an amplitude and a phase. Preferably, this transform will correspond to a fast Fourier transform (FFT). The spectral information is submitted to a component estimator 19. This estimator 19 finds the amplitude, the phase and the frequency in order of spectral line of one or several tones. The PCU 1 may at this point stop the processing and transmit the amplitude, frequency and phase values as well as the time tag 20 of the GPS receiver 12 and three values of the counter 14 connected to the reference clock 13 (as shown in FIG. 2) to the PPU 2 (as shown in FIG. 1). Preferably, the three count values 21 of the counter 14 consist respectively of a count_0 22 corresponding to a first sample of the selected time block, a count_N−1 24 corresponding to the last sample of this same block and an OPPS value 23 of the counter 14 when reset at the last transition of the synchronization signal (e.g. one pulse per second) provided by the GPS receiver 12. The time tag may point the beginning, the middle or the end of the selected block, or another specific point of the block if desired. It should be noted that another change like a transition of the counting direction may be achieved instead of a reset of the counter 14. Or yet, the counter 14 may be subjected to no changes provided that the OPPS count value of the counter 14 indicating a time mark provided by the synchronization signal is retained. In such a case, the rate of the time marks provided by the synchronization signal will preferably be higher than a count cycle of the counter 14 in order to simplify the processing of the time marks. Only the OPPS count value 23 and another count value may be transmitted if desired.

The following processing may be carried out in a PCU 1 (as shown in FIGS. 1 and 2) or the PPU 2 (as shown in FIG. 1). For the estimation of the frequency, the adjustment of the phase to a given time reference as well as the generation of time tags, the estimator 19 uses the information 20 transmitted to it by the GPS receiver 12 as well as three count values 21 of the counter 14 connected to the reference clock 13. The information 20 of the GPS receiver 12 corresponds to the current time tag hour/minute/second (and possibly day/month/year). The OPPS value 23 allows characterizing the frequency of the reference clock 13 and thus giving a time value to each count 21. For example, for a 100 MHz reference clock, the count 21 gives an OPPS value 23 that may typically vary from some units around 100 millions of samples. To a $k^{th}$ count will then corresponds the time tag $$t_k = \left\{\text{Hours: Minutes: Seconds} + \frac{k}{OPPS}\right\}. \quad (1)$$

The particular case shown in FIG. 4 where the counter 14 is reset between the first and the last sample of the selected block should be considered if needed. In such a case, the "second" value is incremented for the calculation of the time tags subsequent to the reset of the counter 14, and the possible overflow cases of the second, minute and hour values (and day, month, year if applicable) are processed. In the case where a temporary loss of the synchronization signal occurs, this may be the last OPPS value that is retained by the PCU for its calculation in equation (1) and the k value may fairly exceed the OPPS value so as to count several seconds. The k value will include the wrap arounds of the counter 14 if needed.

If the reference clock 13 is chosen for its stability, by contrast, the other clocks in the different converters 8 may substantially drift. To the count values count_N−1 24 and count_0 22 correspond the time tags $t_{count\_N-1}$ and $t_{count\_0}$ according to the transformation given in (1). The time tags $t_{count\_N-1}$ and $t_{count\_0}$ allow characterizing the mean frequency of each converter 8. Thus, the equation $$f = \frac{i}{t_{count\_N-1} - t_{count\_0}} \cdot \frac{N-1}{N} \quad (2)$$

where N is the number of samples of the block, allows the conversion in Hertz of the frequency expressed in spectral line number i of a tone. It should be noted that in the case where the estimator 19 has performed an interpolation, i is not an integer.

A phase value has a meaning provided that this value is referenced to a time position. For example, the classical Fourier transform algorithm references the phase with respect to the first time sample of the block. Whether in the PCU 1 or the PPU 2, it is sometimes necessary to convert the phase value of a tone for another time reference. Let $$\theta_2 = \theta_1 + 2\pi f(t_2 - t_1) \text{ in radians} \quad (3)$$

be the phase correction applied when passing from the time reference $t_1$ to the reference $t_2$, $t_1$ and $t_2$ being time tags expressed in seconds.

The amplitude, phase and frequency values calculated according to (2) as well as a unique time tag calculated according to (1) for which the phase is referenced according to (3) if required may then be transmitted by the PCU 1 to the PPU 2. The PCU 1 may also transmit a state of the GPS and an "in sync" or "out of sync" state of the OPPS value used in its calculation. Optionally, as explained hereinafter, a reduction of the noise of the GPS receiver 12 and a compensation of the drifts of the reference clock 13 consisting in adding the three values count_0 22, OPPS 23 and count_N−1 24 of the counter 14 to the analysis results of each block and transmitting the whole to the PPU 2 may be achieved.

Regarding the phase of cyclostationary phenomena, the present method for time synchronization may apply in the following way. The goal is to angularly or temporally positioning, which comes to the same, a cyclostationarity according to a determined time reference. A first way consists in using, in the synchronization method, a wavelet transform with a wavelet similar to the actual cyclostationarity. Temporally, the phase zero then corresponds to the beginning of a cycle while the 2π (N−1)/N value corresponds to the phase of the last sample of the cycle. A second way involves a harmonic analysis where the cyclostationarity is considered as a sum of the harmonic components. The phase of each component is then taken into account and individually synchronized by the method according to the invention. From each one of these phases may be inferred a harmonic position and from all these positions, according to a selected weighting (amplitude of the harmonic, power, amplitude×frequency . . . ), the group delay corresponding to the harmonics is estimated.

Referring back to FIG. 1, the phase processing unit (PPU) 2 comprises a processing unit 25 including a processor 28 or a similar circuit with memory, that collects the data deriving from the different PCUs 1 through a communication interface 26. The processing unit 25 at first regroups (or selects) all the data that have a similar time tag. This regrouping may be made at a given time interval, made in response to a command or made at each arrival of a new data set from the PCUs 1. The selection of similar time tags ensures that the corresponding measurement blocks processed in the different PCUs 1 are approximately temporally overlapping. This overlapping allows remaining close to the available ultimate precision. The available ultimate precision is defined as the Cramer-Rao bound (cf. C. Rife and R. Boorstyn, "Single-tone parameter estimation from discrete-time observation", IEEE Transactions on Information Theory, IT-20, no. 5, pp. 591-598, 1974) for the estimation of a continuous tone to which is added (1) the contribution of the time tag errors in the estimation of the frequency and of the phase of the tone and (2) the contribution of the temporal overlapping deviations between the blocks of the different measurements considering the fact that the tone slowly varies in amplitude and in frequency. The processing unit 25 of the PPU 2 calculates new phase values of each measurement according to a common time reference by applying equation (3). The common time reference should be as close as possible to the time tags being processed to minimize the errors on the adjustment of the phase values. This time reference may be a predetermined value, one of the tag values of the set being processed, or a tag corresponding to a temporal mean of the tags of the set being processed.

Referring also to FIG. 2, regarding the option for the reduction of the noise of the GPS receiver 12 and the compensation of the drifts of the reference clock 13 of a PCU 1, the three values count_0 22, OPPS 23 and count_N−1 24 of the counter 14 transmitted by a PCU 1 may be used to recover the original values (k,θ)-position of a count value and phase. It should be noted that the noise of the GPS receiver 12 and the drifts of the reference clock 13 exhibit almost opposite spectral distributions: the noise corresponding to the time deviations of the synchronization given by the GPS receiver 12 is located toward the short time periods, in the order of the second, whereas the drifts of the reference clock 13 appear to be important for longer time periods, in the order of several tens of minutes. A FIR or IRR filter may then be applied on the successive OPPS values gathered by the PPU 2 so as to reduce the noise of the GPS receiver 12. The result filtered from the fluctuations of the GPS receiver 12 provides a good estimation of the behavior of the reference clock 13. It is a matter of regenerating the count values of the counter 14 from the new filtered OPPS values. To compensate the drifts of the reference clock 13, it is a matter of finding the time shift transformation that gives a constant OPPS: the time curve resulting from an interpolation of the summation of the OPPS values is then viewed as the reverse transfer function of the one looked for. The time transfer function is applied on the regenerated count values. Equations (1), (2) and (3) are then taken back with the new filtered and corrected values. It should be noted that the other phase synchronization methods, such as the synchronous sampling, do not allow this fine correction. However, the counterpart of this correction is an additional delay in the final delivery of the result, this delay minimally corresponding to the half width of the FIR filter applied to the OPPS values plus a certain calculation time.

The synchronized phase values, as the corrected frequency values and the amplitude values may be externally transmitted via the communication interface 26. Externally, these data may be used in as various contexts as the predictive monitoring, the equipment diagnostic or the process control.

The data processing functionalities of the PPU 2 may be integrated in one, several or all of the PCUs 1 if needed in order to reduce the material costs and extend the application field of the method. The material functionalities and the data processing functionalities of the PCU 1 and PPU 2 units may be merged into a same unit.

As a non-limitative example, the system and the method according to the invention allow the live monitoring of transformer bushings.

Figure 5:
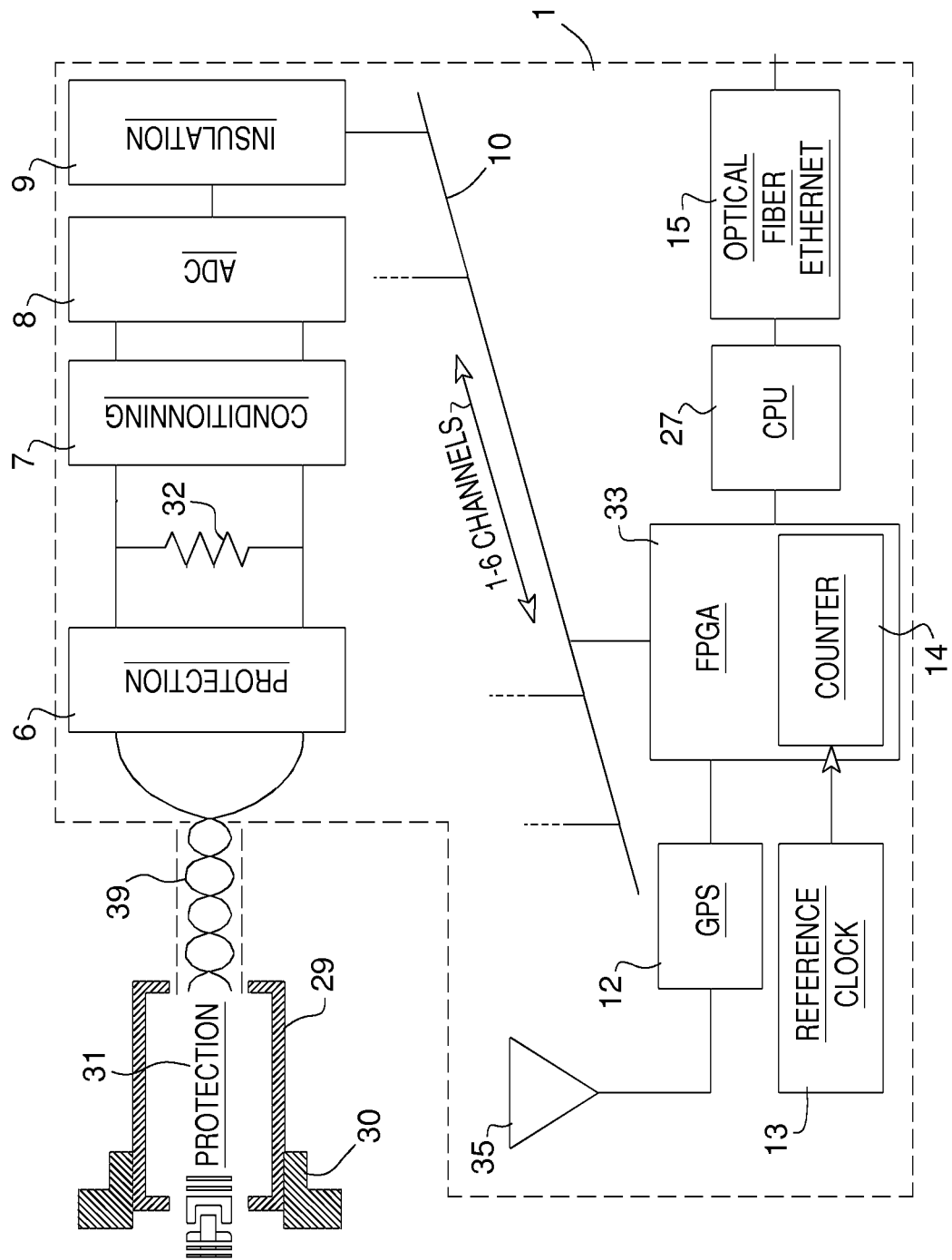
FIG. 5 is a schematic diagram showing a phase measurement unit (PCU) for signals picked up on a transformer bushing according to the invention.

Referring to FIG. 5, there is shown an example of installation of a system according to the invention to a sensor 29 of a transformer bushing 30. The PCU 1 has in the illustrated case 6 acquisition channels that may be connected to as many sensors if desired, e.g. via the common bus 10. Overvoltage protection devices 31, 6 are included in the bushing sensor 29 and at the input of each channel, and may be interconnected by a shielded twisted pair 39. A channel is preferably made of a conditioning circuit 7 with shunt 32, a sigma-delta analog-to-digital converter 8 (24 bit ADC) and a digital insulation circuit 9. This setup exhibits a high immunity to noise and to a voltage rise with respect to ground, and the intrinsic synchronization of the oversampling converters 8 when driven by a common clock. Furthermore, the oversampling converter 8 allows using a simpler anti-aliasing filter in the conditioning circuit 7, which helps minimizing the perturbations in the phase angle and amplitude measurements at the network frequency.

The system may be configured to calculate the phase and the amplitude of all the channels every minute. The results may be stored in a local storage device on the network (not shown) and transferred off-site once a day to a central database (not shown) for analysis.

A relative measurement method that uses two or more bushings in parallel on a same electrical phase and that calculates the ratio of the amplitudes and the tangent of the phase angle between the fundamental components of the bushing insulation currents is preferred. The internal dielectric insulation of high-voltage bushings comprises a stack of interposed conductive and dielectric liners. A deterioration is characterized by a damaging of one or several dielectric liners ultimately causing a short circuit between liners. The damaging of the dielectric alters the phase relation between the current of the fundamental component at the network 60 Hz (or another operating frequency if applicable) flowing through the bushing insulation and the voltage across this insulation. The partially or fully short-circuited liners directly influence the value of the equivalent capacity of the bushing affecting the amplitude of the 60 Hz component current. The monitoring of the internal dielectric insulation of bushings involves a monitoring of the temporal evolution of the phase and current values from the moment when the equipment is put into service, with the assumption that the bushings were in good state when put into service. Typically, for a bushing comprising a hundred of liners, a defect presence diagnostic is attributed to one of the bushings when the tangent value of the voltage/current phase angle (tan δ) varies from 0.005 or more. Also, a deviation of more than 1% on the temporal evolution of the relative amplitudes between two bushings denotes the presence of at least one short circuit in the liners. The tangent of the synchronized phase difference between two bushings is sensitive to any change in the power/dissipation factor of one of the bushings, and the ratio of the amplitudes is sensitive to the changes in the capacitance of one of the bushings. If relative measurements are carried out using three elements of the equipment in parallel, then the defective bushing can be identified. The inter-phase voltage asymmetry will not affect the interpretation, since the applied voltage is essentially the same for all the equipment connected in parallel. The method of the sum of the currents of three bushings connected to the three phases, for example on the primary side of a transformer, is less sensitive. Conversely, in the case of several short-circuited liners, this method allows confirming and/or clarifying the diagnostic. For example, in the case of an installation comprising only two transformers, the method of the sum of currents allows targeting the transformer having the defective bushing if the defect is pronounced on one of the bushings.

Figure 6:
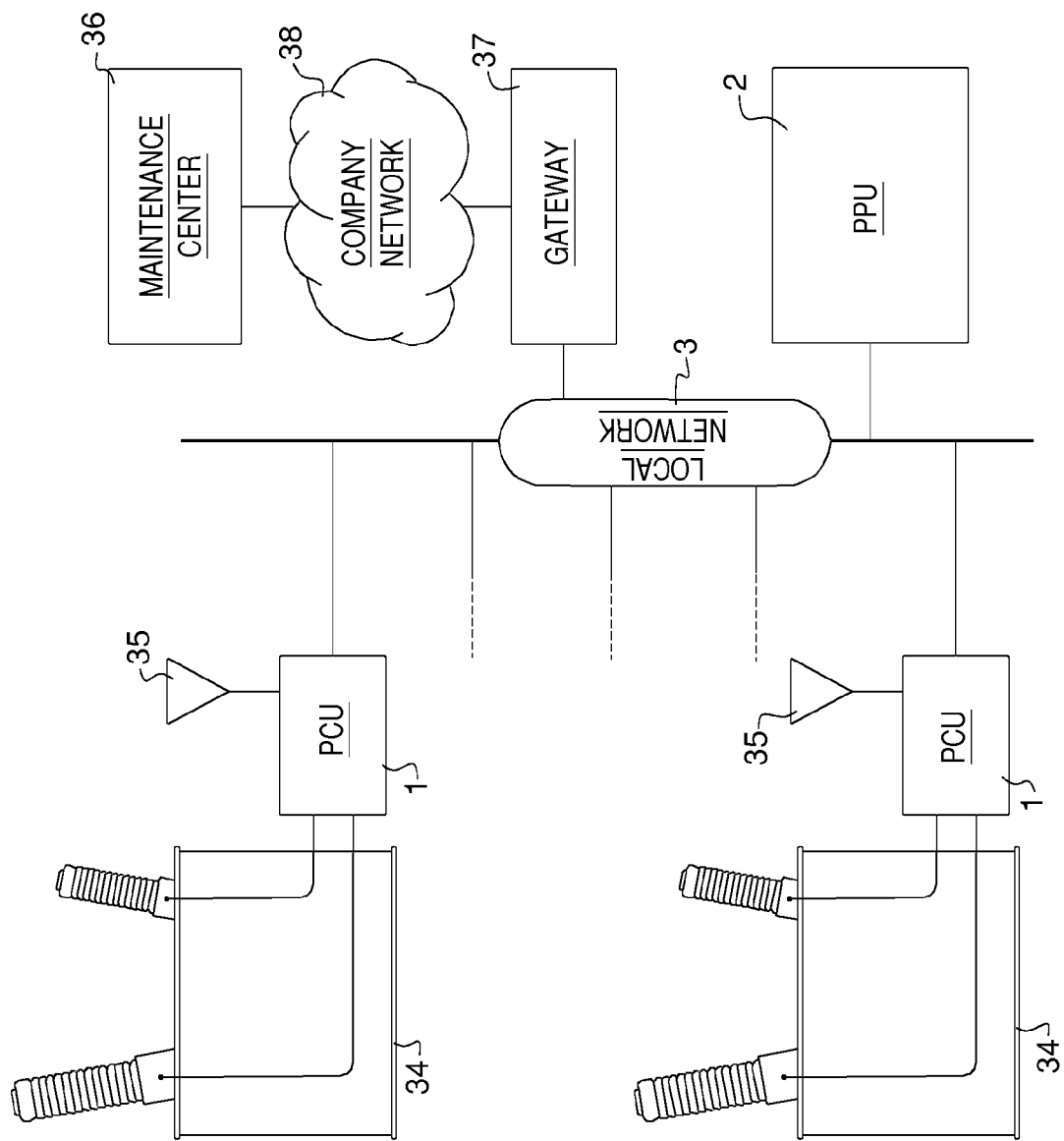
FIG. 6 is a schematic diagram showing a system according to the invention for a monitoring of transformer bushings.

Referring to FIG. 6, the processing unit 11 of each PCU 1 (as shown in FIG. 2) is configured to calculate a phasor of the current of the sensor 29 (as shown in FIG. 5) and to transfer the GPS time tagged measurements to the processing unit of a PPU 2 which in the illustrated case is a bushing diagnostic unit, using a communication network 3 that may already be existing in such installations. Each PCU 1 is connected to the sensors 29 of the bushings of the transformers 34 and installed in its housing. A GPS antenna 35 is connected to the synchronization receiver (e.g. GPS receiver 12 as shown in FIG. 2) of each PCU 1.

The PPU 2 may be located in a substation control building. It may receive the phasors from the PCUs 1, calculate the Δ tan δ (time differences of the tangents of phase angle differences) and amplitude ratios, store the data, perform trend analyses, make a local diagnostic and transmit possible alarms to a maintenance center 36 e.g. connected to the network 3 via a gateway 37 and a company network 38. The PPU 2 may also allow the maintenance staff to remotely explore and analyze the relevant data.

The local network 3 in the substation yard connects the control building to the housings of the high-voltage transformers 34. The use of an already existing network allows a significant reduction of the setup and maintenance costs.

Referring back to FIG. 5, the values of shunt 32 are preferably chosen to adapt the rated current of the sensor 29, which is function of the bushing capacity (pF) and voltage, to the input range of the converter 8. The PCU 1 may comprise a FPGA (Field-Programmable Gate Array) 33 used for the time tagging of the samples from the converter 8 at the resolution of the reference clock 13. The counter 14 implemented in the FPGA 33 is operated by the clock 13, e.g. having a low temperature drift and clocked at 125 MHz. The counter 14 is preferably reset by the one-pulse-per-second signal (1PPS) of the GPS receiver 12. The time intervals between the pulses are also used to calculate the frequency of the reference clock 13. Since the noise of the signal provided by the GPS receiver 12 is not correlated with the noise of the reference clock 13 used for the sampling, processings may be carried out to reduce both noises as previously explained.

In addition to the time tagging, the FPGA 33 may also be used as first stage of the signal processing, buffer and interface with the processor 27. The processor 27 is in charge of the phase angle and amplitude calculation of the time tagged signals from the converters 8. The PCU 1 transmits the resulting phasor data through its Ethernet fiber optic port 15 to the PPU 2 as the one shown in FIG. 6.

The effect of harmonics in the voltage may cause a significant error in the digital processings that are based on a zero crossing detection. In the present case, the delta-sigma converter 8 converts the signal e.g. at 50 k samples per second. In order to reduce the processing power requirements, the digital signal may be filtered with a low-pass FIR and decimated by ten. With a 5 kHz sampling rate, a fast Fourier transform (FFT) processes 83.3 samples per cycle. The maximum number of cycles processed by a FFT is set by the stability of the network frequency, and the minimum by the spectral window type and the desired rejection of sub-synchronous components.

The product of the spectral window, the FFT and the estimation of the spectral component parameter are achieved by the CPU 27. Since the reference clock 13 is more precise than that of the converter 8, the sampling frequency is estimated from the last 1 PPS count value. The phase is referenced to the time tag generated from the count values and the GPS data. The Δ tan δ values are estimated by the PPU 2 (as shown in FIG. 6) considering the time tags and the respective frequencies of the reference clocks 13.

The use of a spectral window with side lobes having a high rejection rate allows a rejection exceeding 90 dB of harmonic and sub-synchronous components. The spectral estimation precision is function of the signal-noise ratio:

$$\text{SNR} = G \cdot \sqrt{N} \cdot a_0 / \sigma_w \text{ in dB} \tag{4}$$

under a spectral lobe where G depicts the processing gain factor of the spectral window, N depicts the number of time samples processed by the FFT, and $a_0/\sigma_w$ depicts the ratio of peak signal amplitude over RMS amplitude of the white noise.

By choosing a Blackman-Harris window, for N=4096 samples, the signal-noise ratio under the spectral lobe is SNR (db)=$a_0/\sigma_w$ (dB)+32.6 dB, expressed in dB. The standard deviation of phase for a bushing A, expressed in degrees, is linked by $$\sigma_{\theta A} > \frac{180°}{\pi} \cdot \frac{1}{SNR} \tag{5}$$

Supposing a non-correlated noise between the measurements, the standard deviation Δ tan δ is the quadratic sum of the standard deviations of two phase estimations. Since $\sigma_{\theta A} \approx \sigma_{\theta B}$, the standard deviation Δ tan δ is $$\sigma_{\Delta \tan \delta} > \frac{\sqrt{2}}{SNR} \text{ or } \sigma_{\Delta \tan \delta} > -(a_0/\sigma_w(\text{dB}) + 29.6 \text{ dB}) \tag{6}$$

expressed in dB. Taking into account the analog white noise and the equivalent noise of the converter 8, the typical precision of Δ tan δ exceeds −100 dB or 0.001%. The corresponding dispersion delay is 27 ns, in the same range as the GPS noise. This precision may be reached with a standard galvanic system. The measurement precision is not disturbed by the reference clock 13 or the drift of the network frequencies. The contribution of the PPU 2 to the dispersion Δ tan δ is the quadratic sum:

$$\sigma_{BDU}^2 = \sigma_{\Delta \tan \delta}^2 + \sigma_{GPS}^2 \tag{7}$$

where $\sigma_{GPS} = \Delta t_{GPS} \cdot 2\pi \cdot 60$ Hz and $\Delta t_{GPS}$ is the GPS noise. In the case of non-correlated noise between the PCUs 1, the GPS noise is the quadratic sum of the noise from two different GPS receivers 12. Measured typical values make a GPS noise contribution $\Delta t_{GPS}^2$ of 50 ns or 0.0018% in equation (7).

The PPU 2 may be configured to identify the measurements that may be biased due for example to a climatic phenomenon like rain or a phenomenon having a similar effect on the measurements, in order for example to reject them and not use them in the calculations used to establish a monitoring diagnostic of bushings. As indicated above, important transients may be observed on a differential measurement $\Delta \tan \delta$ between a 60 Hz wave derived from a capacitive coupler on two bushings. Some of these transients may be associated to a presence of rain. However, an automated continuous monitoring requires a continuation of a trend deprived of undesired transients as those caused by rain. The proposed method relies upon a local time stability of the measurements estimated from a standard deviation over several successive estimations of $\Delta \tan \delta$. A measurement may be deemed invalid when the standard deviation exceeds a pre-established threshold. The threshold may be set manually or automatically determined by a simple statistical calculation when enough measurements have been gathered. In a possible configuration of the system according to the invention, the PPU 2 calculates the successive values $\Delta \tan \delta$ in the measurement period set, e.g. of 2 seconds, by achieving e.g. 36 fast Fourier transforms (FFT) of 1024 samples with an overlapping of 75% over the time length of the period, within moments following the activation of the system. Two successive FFTs are thus distant by 256 samples. The two extreme FFTs are preferably removed to keep only the 34 other ones. Because of the overlapping of the FFTs, the successive estimation values of $\Delta \tan \delta$ are not quite independent: the weight of the statistical sampling is not 34 but rather closer to 15. A longer period or shorter FFTs may be statistically advantageous. In presence of a light rainfall, a flickering of the measurements with a zero mean will appear, suggesting that there is no significant film of water and that the rainfall evaporates faster than the water input. When the rainfall increases, a continuous component will appear (i.e. with a zero mean) in the flickering. This component may correspond to a bushing that would be wetter than the other. The statistical distribution of the standard deviation on the dispersion of the instant measurements of $\Delta \tan \delta$, calculated with a log application of the decibel calculation before statistical binning, exhibits an overlapping of two distribution types.

The first distribution is Gaussian and corresponds to the measurement noise in the absence of a disturbance. The second distribution being the rightmost one and corresponds to the disturbances imputed to rainfalls. The setting of a detection threshold is a compromise between sensitivity and false detection probability. The threshold may be set at a distance of two to three times the standard deviation of an undisturbed value. The maximum likelihood is obtained for signal processing manipulations achieved in a representation space where the noise looks Gaussian, as is the case here. The threshold value will possibly be several times higher for low-voltage side measurements that are disturbed for example by switching devices. The threshold may initially be set to a high value as initial value in a running mean that gradually adjusts the threshold value to the mean standard deviation plus three times the standard deviation of the standard deviation estimated from the filtered values. A min/max limit with fault warning may limit the threshold value swing in order to guarantee the robustness. The analysis results of the measurements may be derived from a comparison between the threshold and the max$\{ETY(\Delta \tan \delta), \overline{E}_n\}$ where ETY depicts an estimation of $\Delta \tan \delta$ and the running mean $\overline{E}_n$ is simply a weighting of the standard deviation (ETY) with a forgetting factor of 25%. It can be expressed as $\overline{E}_n = 0.75 \cdot \overline{E}_n + 0.25 \cdot ETY_n$ where $ETY_n = ETY(\tan(\delta_{n,channelx}) - \tan(\delta_{n,channely}))$. This approach allows at the same time to instantaneously respond to a sudden increase of the ETY and to extend the rejection of the estimated values to some measurements after a burst of the ETY. This thus ensures a good cleaning around a burst of the ETY. For a multi-transformer monitoring, the exceeding of the thresholds may be combined over the different bushings. The combination should accept the defect of a bushing that would conduct to an exceeding of the threshold for the calculations involving the bushing. For example, it is possible that intermittent partial discharges in the liners of a bushing increase the dispersion of the instant ETY. Such an event being unlikely to occur simultaneously in two bushings, it is possible to adjust the decision to "more than one bushing"=rainfalls. There are no relations between the variations of the signal-to-noise ratio values and the means of $\Delta \tan \delta$ or the standard deviations of $\Delta \tan \delta$. The disturbances under the base of the 60 Hz components have low amplitudes and comprise a random part and another deterministic one between two bushings. The variations under the base of the 60 Hz component are correlated in part from one bushing to another for the same phase: in the tan $\delta$ comparison, this noise is mostly eliminated by the tangent to tangent subtraction.

The method and the system according to the invention allow among other things to monitor the appearance of cracking in a structure as that of a drilling platform that uses two or more measurement points in parallel installed on the structure and that calculates the amplitudes and phases of vibration modes affecting the structure. The appearance of a crack alters the distribution of the antinodes and nodes of the structural modes of the platform and also shifts their frequencies. The monitoring of this distribution allows detecting the diagnostic symptoms of a cracking. The method according to the invention allows a no cable low cost installation between the different measurement points. Typically, the measurement points comprise triaxial accelerometers, strain gauges and displacement transducers. Preferably, the time synchronization will be provided by GPS. At the output of the processing carried out by the method, the amplitude, phase and structural mode frequency values may be compared to a digital model to which a suspected defect is inserted in order to observe the correspondence between respective modes and determine the trueness of the suspected defect.

In a context of semi-passive sonar or radar localization, the measurements processed by the method according to the invention may derive from two or more passive receivers in parallel, at least one transmitter and a target, the processing then calculating the phase angle between at least one component of the signal transmitted by the transmitter and reflected by the target and calculating the fine frequency of the transmitted and reflected components. The receivers and the transmitters may be of radiometric, ultrasonic or acoustic types. The time synchronization will be provided by GPS, an electrical radio or light wave or any other communication means able to provide the required synchronization signal. In addition to the information provided by the transient fronts of the wave pulses, the phase information adds precision to the respective localization of the transmitters, receivers and targets. The fine frequency information adds precision to the estimation of the respective speeds of the transmitters, receivers and targets. The method allows a more precise measurement at lower cost and gives access to the use of lower frequencies where, without the proposed method, the use of the wave front would have a precision limited by the wavelength.

The method according to the invention also allows simultaneously monitoring several measurement points located at electrical potentials preventing the wiring of these measurement points and thus requiring PCUs 1 in the form of autonomous sensors. For example, for the monitoring of break chambers of high power circuit breakers, the vibro-acoustic measurement as the radio-electric measurement provide an information full of diagnostic symptoms of the equipment's electromechanical state. However, in both cases, the autonomous sensor should be affixed on the break chamber to maximize the ratio of the signal from a break chamber over that of the other chambers. The sensor is thus located at the potential of the high-voltage line. Apart the question of the autonomous supply which may be achieved in different ways, that of the synchronization is generally problematic. The phase synchronization according to the invention allows solving this problem. The measurement of interest takes place during a switching of the circuit breaker. The autonomous sensor is preferably configured to sleep between two switchings. For energy saving purposes, it may be forced to take a measurement before the arrival of the first synchronization signal (the GPS receiver 12 being switched off just before). The method may then proceed by retaining the count of two successive synchronization transitions in the temporal vicinity of the analyzed block. It should be noted that the break chambers of circuit breakers are connected together in series for a same circuit breaker. The radio-electric and vibro-acoustic behaviors of these chambers are interrelated and require to synchronously compare the signatures, including the phase of the components forming these signatures. The implementation of a synchronous digitization over time as used in the PMUs cannot be considered for the autonomous sensors because such a means would not allow a deep sleep of the sensor due to the real-time synchronization involving an energy consumption of several orders of magnitude higher than the proposed means without mentioning the also higher material costs. An autonomous sensor based on a PCU 1 typically internally or proximately comprises a vibro-acoustic sensor like an accelerometer, a measurement antenna, a communication antenna, a temperature measurement, a current measurement, the current measurement being possibly also used as a power supply source. The processings carried out by the PPU 2 receiving the data from the PCUs 1 may come down to achieve a post-synchronization of the phase.

If a GPS signal or other link specifically dedicated to the fine time synchronization is not available, it is possible to use certain ambient signals available to all the PCUs 1, such as a radio-electric transmission (AM, FM, TV station), a sound or an optical signal. The method then involves measuring a common ambient signal as reference for correcting the small amplitude temporal variations of a first coarse synchronization stage. A double differential is here considered, namely a difference between a reference channel of a PCU 1 and its other channels and a difference between the values derived from two PCUs 1. In a possible embodiment, each PCU 1 dedicates one of its analog channels to the measurement and processing of the synchronization signal. A first coarse synchronization means, such as a simple inter-PCU communication according to the IEEE 1588 standard, achieves an approximate tuning of the clocks 13 of the PCUs 1 and operates the counters 14. The method requires creating a calibration table of the reception delays of the PCUs 1 for a position of the fine synchronization source. The values of the calibration table may be estimated by a simple wave propagation calculation while considering the respective PCUs 1 and source positions, the values of the calculated delays being relative (for example to the PCU 1 the closest to the source).

Two equivalent phase correction approaches may be used. In a first case, the phase measured on the synchronization reference channel is taken into account to correct the phase of the components of the other channels in the PCU 1, in which case the phase correction to be made in a phase comparison between two PCUs 1 will be function of a phase delay value stored in the calibration table for the PCUs 1 involved in the comparison. In a second case, the phases of components measured by two PCUs 1 are subtracted, in which case the phase correction to be made will be function of the phase difference of the synchronization signal measured by each PCU 1 and a phase delay value stored in the calibration table for each PCU 1. All these phase corrections are eventually carried back in the time domain according to the frequency of the synchronization signal and transposed back in the phase domain while considering the frequency of the component measured on the channels involved in the comparison. In this way, the cost of a GPS is saved but a measurement channel is lost. Also, the sampling rate must be at least two times higher than that of the synchronization signal and the imprecision of the coarse synchronization of the first stage must be lower than the period of the synchronization signal.

While embodiments of the invention have been illustrated in the accompanying drawings and described above, it will be evident to those skilled in the art that modifications may be made therein without departing from the invention.

What is claimed is:

1. A method for time synchronization of phase of signals from respective measurement devices, the method comprising the steps of:
   for each measurement device having an associated phase measurement unit:
      receiving, with a receiver, a synchronization signal available to each measurement device;
      producing, with a clock, a reference clock signal having a higher rate than the synchronization signal;
      operating a counter in response to the reference clock signal to produce count values;
      completing, with a processing unit, the synchronization signal with the count values provided by the counter;
      selecting at least one time block having a finite number of samples in the signal from the measurement device;
      establishing time locations of at least two samples of each time block with the completed synchronization signal;
      estimating a phase value and a temporal characteristic of at least one component of the signal from the measurement device in each time block;
      assigning a time tag derived from the completed synchronization signal to each time block; and
      producing data representative of the at least one component, the phase value, the temporal characteristic, the time locations and the time tag for each time block; and
   with a phase processing unit for all the measurement devices:
      regrouping, with a processing unit the data relative to the time blocks having like time tags under same time tags used as common time references; and
      calculating new phase values of the at least one component in the time blocks according to the respective common time references and the corresponding time locations for the time synchronization of phase of the signals from the measurement devices.

2. The method according to claim 1, wherein the count values provided by the counter are based on a cyclic element of the reference clock signal, the counter being operated to change the count value or a counting direction in response to a time mark in the synchronization signal, the time locations of the samples being relative to the corresponding count values at occurrence of the time mark.

3. The method according to claim 1, further comprising the step of receiving a time signal available to each measurement device, and wherein the time tag assigned to each time block is based on a time measurement unit indicated by the time signal at occurrence of a time mark in the synchronization signal.

4. The method according to claim 3, wherein the synchronization signal and the time signal derive from a same signal.

5. The method according to claim 1, wherein the temporal characteristic of the at least one component of the signal is estimated as function of the time locations of the samples of the time block.

6. The method according to claim 1, wherein the estimated phase value is adjusted as function of the time location corresponding to the time tag of the time block.

7. The method according to claim 1, wherein the at least one component is obtained by carrying out a transform of the signal from the measurement device in a representation domain where the at least one component is distinguishable.

8. The method according to claim 1, further comprising the steps of, for all the measurement devices:
gathering the successive count values of the samples of the time blocks coinciding to time marks in the synchronization signal; and
correcting the phase values and the temporal characteristics of the at least one component observed in the blocks having the same time tag from new count values resulting from a digital processing on the gathered count values.

9. The method according to claim 1, further comprising the steps of, for all the measurement devices:
making successive estimations of time differences of phase angle differences based on the phase values of the components of the regrouped blocks; calculating statistical differences on the successive estimations; and
invalidating a measurement depending on whether the corresponding statistical difference exceeds a predetermined rejection threshold.

10. A system for time synchronization of phase of signals from respective measurement devices, the system comprising:
for each measurement device, a phase measurement unit comprising:
a receiver that receives a synchronization signal available to each phase measurement unit;
a clock that produces a reference clock signal having a higher rate than the synchronization signal; and
a processing unit; and
for all the measurement devices, a phase processing unit comprising a processing unit;
the processing unit of each phase measurement unit being configured to receive the signal from the corresponding measurement device, receive the synchronization signal, receive the reference clock signal, provide a counter operating in response to the reference clock signal to produce count values, complete the synchronization signal with the count values provided by the counter, select at least one time block having a finite number of samples in the signal from the measurement device, establish time locations of at least two samples of each time block with the completed synchronization signal, estimate a phase value and a temporal characteristic of at least one component of the signal from the measurement device in each time block, and produce data representative of the at least one component, the phase value, the temporal characteristic, and the time locations;
the processing unit of one of each phase measurement unit and the phase processing unit being configured to assign a time tag derived from the completed synchronization signal to each time block, the time tag forming part of the data relative to each time block; and
the processing unit of the phase processing unit being configured to regroup the data relative to the time blocks having like time tags under same time tags used as common time references, and calculate new phase values of the at least one component in the time blocks according to the respective common time references and the corresponding time locations for the time synchronization of phase of the signals from the measurement devices.

11. The system according to claim 10, wherein the count values provided by the counter are based on a cyclic element of the reference clock signal, the counter being operated to change the count value or a counting direction in response to a time mark in the synchronization signal, the time locations of the samples being relative to the corresponding count values at occurrence of the time mark.

12. The system according to claim 10, wherein the processing unit of each phase measurement unit is configured to receive a time signal available to each measurement device, and the time tag assigned to each time block is based on a time measurement unit indicated by the time signal at occurrence of a time mark in the synchronization signal.

13. The system according to claim 12, wherein the synchronization signal and the time signal derive from a same signal.

14. The system according to claim 10, wherein the temporal characteristic of the at least one component of the signal is estimated as function of the time locations of the samples of the time block.

15. The system according to claim 10, wherein the estimated phase value is adjusted as function of the time location corresponding to the time tag of the time block.

16. The system according to claim 10, wherein the processing unit of each phase measurement unit is configured to obtain the at least one component by carrying out a transform of the signal from the measurement device in a representation domain where the at least one component is distinguishable.

17. The system according to claim 10, wherein a group of the phase measurement units share at least one of a same receiver and a same clock via a common bus between the at least one of the same receiver and the same clock and the processing units of the group of the phase measurement units.

18. The system according to claim 10, wherein each phase measurement unit and the phase processing unit comprise respective communication interfaces connecting to a network.

19. The system according to claim 10, wherein the receiver is a GPS receiver.

20. The system according to claim 10, further comprising, for each phase measurement unit, at least one of:
a filter that filters the signals from the measurement devices;
an amplifier that amplifies the signals from the measurement devices;
an integrator or a differentiator that integrates or differentiates the signals from the measurement devices;
a decimator that decimates the signals from the measurement device;

for each measurement unit providing an analog signal,
an analog-to-digital converter that digitizes the analog signal from the measurement device into a digital signal; and
a galvanic insulation that insulates the phase measurement unit from the corresponding measurement device.

21. The system according to claim 10, wherein each common time reference is defined by a predetermined value associated to the regrouped blocks, one of the time tags of the regrouped blocks, or a tag corresponding to a temporal mean of the time tags of the regrouped blocks.

22. The system according to claim 10, wherein the processing unit of the phase processing unit is configured to:
make successive estimations of time differences of phase angle differences based on the phase values of the components of the regrouped blocks;
calculate statistical differences on the successive estimations; and
invalidate a measurement depending on whether the corresponding statistical difference exceeds a predetermined rejection threshold.

* * * * *